(12) United States Patent
Kozaki

(10) Patent No.: US 9,065,369 B2
(45) Date of Patent: Jun. 23, 2015

(54) MOTOR DRIVING DEVICE AND VACUUM PUMP

(71) Applicant: Shimadzu Corporation, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 14/155,477

(22) Filed: Jan. 15, 2014

(65) Prior Publication Data

US 2014/0203742 A1 Jul. 24, 2014

(30) Foreign Application Priority Data

Jan. 18, 2013 (JP) ................................. 2013-007539

(51) Int. Cl.
*H02P 21/00* (2006.01)
*F04D 19/04* (2006.01)
*H02P 6/18* (2006.01)

(52) U.S. Cl.
CPC ............ *H02P 6/182* (2013.01); *H02P 21/0039* (2013.01)

(58) Field of Classification Search
CPC ............. H02P 21/00; H02P 6/20; H02P 1/04; H02P 21/0032
USPC .......... 318/400.02, 400.22, 400.33, 430, 461; 701/99; 417/423.12; 68/12.16
See application file for complete search history.

(56) References Cited

U.S. PATENT DOCUMENTS

| | | | |
|---|---|---|---|
| 6,288,510 B1 * | 9/2001 | Toyama | 318/461 |
| 7,579,798 B2 * | 8/2009 | Hosoito et al. | 318/400.02 |
| 7,619,385 B2 * | 11/2009 | Suzuki et al. | 318/705 |
| 7,818,111 B2 * | 10/2010 | Fujishiro et al. | 701/99 |
| 8,536,812 B2 * | 9/2013 | Maekawa | 318/400.23 |
| 2005/0160771 A1 * | 7/2005 | Hosoito et al. | 68/12.16 |
| 2007/0024232 A1 * | 2/2007 | Suzuki et al. | 318/812 |
| 2008/0040015 A1 * | 2/2008 | Fujishiro et al. | 701/99 |
| 2009/0056385 A1 * | 3/2009 | Maekawa | 68/12.16 |
| 2009/0128074 A1 * | 5/2009 | Hu | 318/400.33 |
| 2013/0187588 A1 * | 7/2013 | Nakata | 318/430 |

FOREIGN PATENT DOCUMENTS

JP 08-256496 10/1996

* cited by examiner

*Primary Examiner* — Paul Ip
(74) *Attorney, Agent, or Firm* — Renner, Otto, Boisselle & Sklar, LLP

(57) ABSTRACT

A motor driving device comprises an inverter, a first arithmetic section, a driving command generating section and a PWM signal generating section. The first arithmetic section calculates a rotational speed and a magnetic pole electrical angle of a motor rotor based on information about a motor phase voltage and information about a motor phase current. The first arithmetic section includes a counter electromotive voltage arithmetic section, a converting section, a second arithmetic section, a third arithmetic section, and a fourth arithmetic section. The first arithmetic section outputs a sum of the magnetic pole phase error and the integrated value as the magnetic pole electrical angle.

6 Claims, 18 Drawing Sheets

MOTOR DRIVING DEVICE AND VACUUM PUMP

BACKGROUND OF THE INVENTION

1. Field of the Invention

The present invention relates to a motor driving device and a vacuum pump having the motor driving device.

2. Description of the Related Art

In vacuum pumps such as turbo-molecular pumps for rotating rotors at a high speed so as to carry out evacuation, DC brushless motors are frequently used as motors for driving to rotate rotors. In vacuum pumps in which rotation sensors are not used, rotational speed information necessary for rotation driving and magnetic pole position information of motor rotors are estimated based on detection signals relating to three-phase voltages and three-phase currents of motors (for example, JP 8-256496 A).

Conventionally, as a method for estimating a magnetic pole position, an estimated electrical angle θ is obtained according to arc tangent operation $\theta = \operatorname{atan}(-E\alpha/E\beta)$. However, two-phase ac signals $E\alpha$ and $E\beta$ include harmonics (harmonics noises such as PWM carrier components) as well as rotational component fundamental harmonics. For this reason, a fluctuation in a waveform of the calculated estimated electrical angle θ is great at every period, a steady-state error occurs, and accuracy of a magnetic pole position cannot be improved On the other hand, a rotational speed ω is obtained according to $\omega = \sqrt{(E\alpha^2 + E\beta^2)}/k$ by utilizing a state that a counter electromotive voltage is proportional to the rotational speed. Since the rotational speed ω is calculated directly based on the two-phase ac signals $E\alpha$ and $E\beta$, similarly it is affected by noises. The calculation of an electrical angle θ utilizes periodicity, but the calculation of the rotational speed ω does not utilize periodicity. For this reason, an error of an estimated amplitude value of the counter electromotive voltage directly becomes a steady-state error.

In the conventional technique, since a fluctuation of an electrical angle (namely, a fluctuation in a magnetic pole position) is great, a ripple occurs in a motor current, and thus driving stability is not satisfactory. Further, electrical efficiency is not satisfactory.

SUMMARY OF THE INVENTION

A motor driving device comprises: an inverter for driving a motor, the inverter having a plurality of switching elements; a first arithmetic section for calculating a rotational speed and a magnetic pole electrical angle of a motor rotor based on information about motor phase voltage and information about motor phase current; a driving command generating section for generating a sinusoidal wave driving command based on a difference between the rotational speed and a target rotational speed and the magnetic pole electrical angle; and a PWM signal generating section for generating a PWM control signal for controlling an ON/OFF state of the plurality of switching elements based on the sinusoidal wave driving command. The first arithmetic section includes a counter electromotive voltage arithmetic section for calculating a first counter electromotive voltage in a fixed coordinate αβ system based on the information about the motor phase voltage and the information about the motor phase current, a converting section for receiving the magnetic pole electrical angle through feedback and converting the first counter electromotive voltage into a second counter electromotive voltage in a rotating coordinate dq system based on the magnetic pole electrical angle, a second arithmetic section for calculating a magnetic pole phase error based on the second counter electromotive voltage, a third arithmetic section for calculating the rotational speed based on at least the information about the motor phase voltage in the information about the motor phase voltage and the information about the motor phase current, and a fourth arithmetic section for calculating an integrated value of the rotational speed calculated by the third arithmetic section, and the first arithmetic section outputs a sum of the magnetic pole phase error and the integrated value as the magnetic pole electrical angle.

Preferably the third arithmetic section includes a converting section for receiving the integrated value as an electrical angle through feedback and converting the first counter electromotive voltage into a third counter electromotive voltage in the rotating coordinate dq system bases on the electrical angle, and the third arithmetic section calculates the rotational speed based on a vector component phase of the third counter electromotive voltage.

Preferably the third arithmetic section calculates the rotational speed based on a vector component phase of the first counter electromotive voltage calculated by the counter electromotive voltage arithmetic section.

Preferably the information about the motor phase voltage is a signal from a voltage sensor for detecting the motor phase voltage, and the third arithmetic section calculates the rotational speed based on the signal from the voltage sensor.

Preferably the motor driving device further comprises a delay correcting section for correcting a phase delay of the magnetic pole electrical angle calculated by the first arithmetic section so as to generate a corrected magnetic pole electrical angle. The driving command generating section generates the sinusoidal wave driving command based on the difference between the rotational speed and the target rotational speed and the corrected magnetic pole electrical angle.

A vacuum pump comprises a pump rotor formed with an evacuating function section; a motor for driving the pump rotor; and the motor driving device for driving the motor.

DETAILED DESCRIPTION OF PREFERRED EMBODIMENTS

Embodiments for carrying out the present invention are described below with reference to the drawings.

First Embodiment

Figure 1:
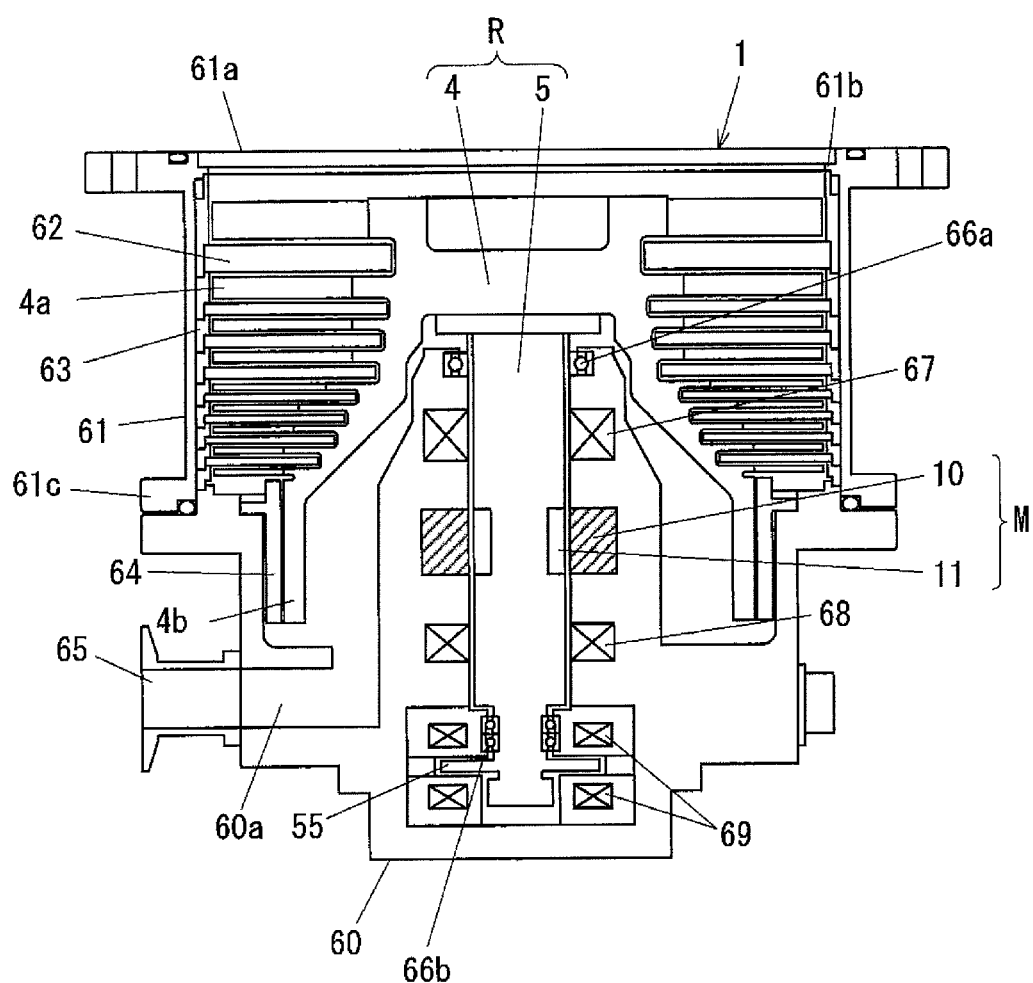
FIG. 1 is a diagram illustrating a constitution of a pump unit in a vacuum pump according to an embodiment.

FIG. 1 is a diagram illustrating a constitution of a pump unit 1 in a vacuum pump according to an embodiment. The vacuum pump has the pump unit 1 and a control unit (not show) for driving the pump unit 1 shown in FIG. 1. The vacuum pump shown in FIG. 1 is a magnetic levitation style turbo-molecular pump.

The pump unit 1 has a turbo pump stage composed of a rotor blade 4a and a fixed blade 62, and a drag pump stage (a thread groove pump) composed of a cylindrical section 4b and a screw stator 64. The thread groove is formed on the screw stator 64 side, but the thread groove may be formed on the cylindrical section 4b side. The rotor blade 4a and the cylindrical section 4b as a rotation-side evacuating function section are formed on a pump rotor 4. The pump rotor 4 is fastened to a shaft 5. The pump rotor 4 and the shaft 5 compose a rotor unit R.

A plurality of stages of the fixed blades 62 and the rotor blades 4a are arranged alternately in an axial direction. Each of the fixed blades 62 is placed on a base 60 via each spacer ring 63. When a fixed flange 61c of a pump case 61 is fixed to the base 60 by a bolt, the laminated spacer rings 63 are held between the base 60 and a locking section 61b of the pump case 61 so that the fixed blade 62 is located.

The shaft 5 is supported by magnetic bearings 67, 68 and 69 provided to the base 60 in a non-contact manner. Each of the magnetic bearings 67, 68 and 69 has an electromagnet and a displacement sensor. The displacement sensor detects a levitation position of the shaft 5. The electromagnet composing the magnetic bearing 69 in an axial direction is arranged so as to hold a rotor disc 55 that is provided to a lower end of the shaft 5 in the axial direction. The shaft 5 is driven to be rotated by a motor M.

The motor M is a synchronous motor, and for example, a permanent magnet synchronous motor is used. The motor M has a motor stator 10 arranged on the base 60, and a motor rotor 11 provided to the shaft 5. The motor rotor 11 is provided with a permanent magnet. When the magnetic bearings do not operate, the shaft 5 is supported by emergency mechanical bearings 66a and 66b.

An exhaust opening 60a of the base 60 is provided with an exhaust port 65, and a back pump is connected to the exhaust port 65. When the rotor unit R is magnetically levitated and is simultaneously driven to be rotated at a high speed by the motor M, gaseous molecules around a suction port 61a are exhausted to the exhaust port 65.

Figure 2:
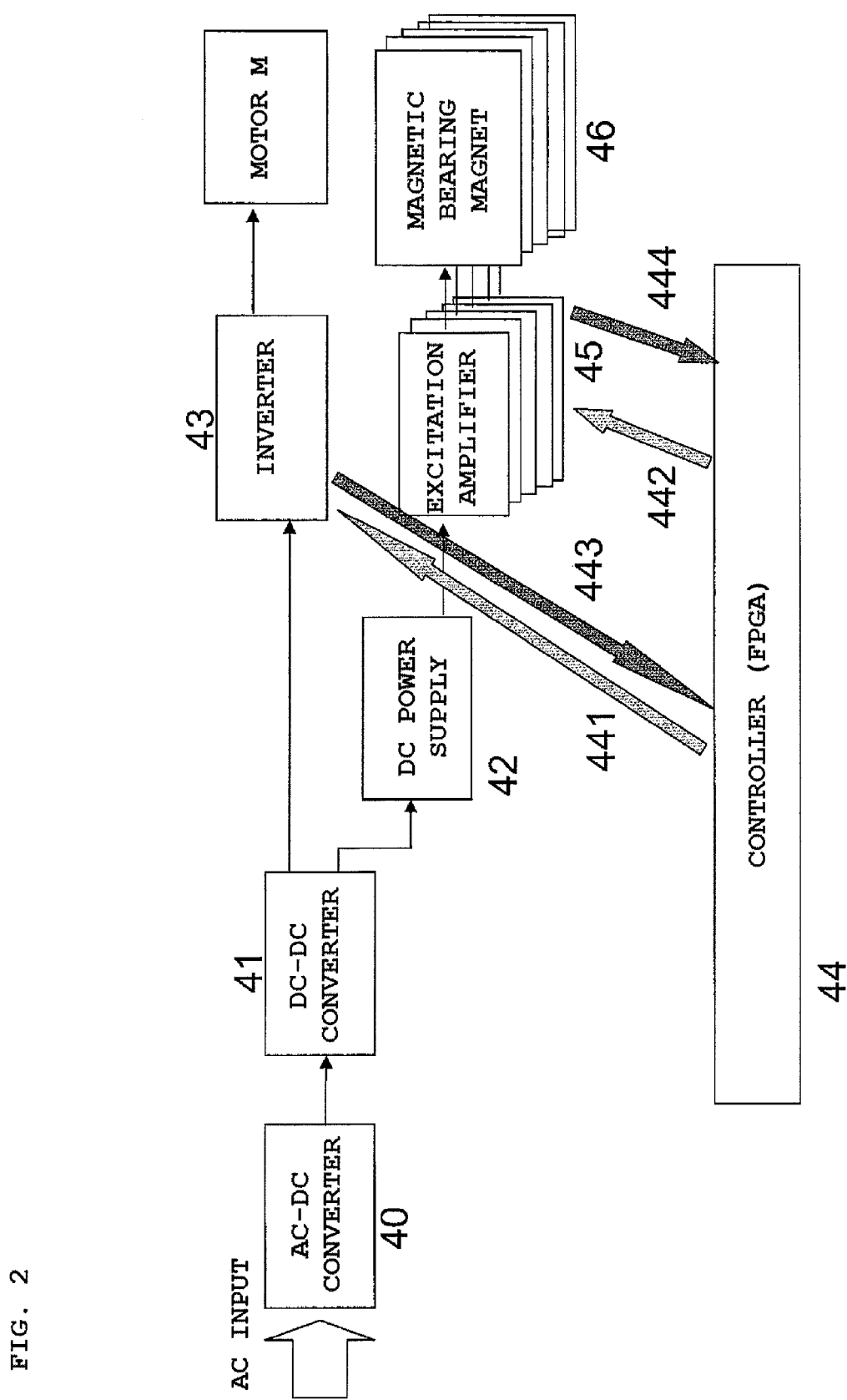
FIG. 2 is a block diagram illustrating a schematic constitution of a control unit.

FIG. 2 is a block diagram illustrating a schematic constitution of a control unit. An AC input from an outside is converted into a DC output (DC voltage) by an AC/DC converter 40 provided to the control unit. The DC voltage output from the AC/DC converter 40 is input into a DC/DC converter 41, and the DC/DC converter 41 generates the DC voltage for the motor M and the DC voltage for the magnetic bearings.

The DC voltage for the motor M is input into an inverter 43. The DC voltage for the magnetic bearings is input into a DC power supply 42 for the magnetic bearings. The magnetic bearings 67, 68 and 69 compose the five-axis magnetic bearing, each of the magnetic bearings 67 and 68 has two pairs of electromagnets 46, and the magnetic bearing 69 has a pair of electromagnets 46. A current is supplied to five pairs of the electromagnets 46, namely, the ten electromagnets 46 individually from ten excitation amplifiers 45 provided for them.

A controller 44 is a digital arithmetic unit for controlling the motor and the magnetic bearings, and for example, FPGA (Field Programmable Gate Array) is used. The controller 44 outputs, to the inverter 43, a PWM control signal 441 for controlling ON/OFF of a plurality of switching elements included in the inverter 43 and outputs, to the excitation amplifiers 45, a PWM control signal 442 for controlling ON/OFF of switching elements included in the excitation amplifiers 45. Further, a signal relating to the motor M (a signal relating to a phase voltage or a phase current) 443 is input into the controller 44 as described later. Further, signals relating to magnetic bearings (exciting current signal and displacement signal) 444 are input.

Figure 3:
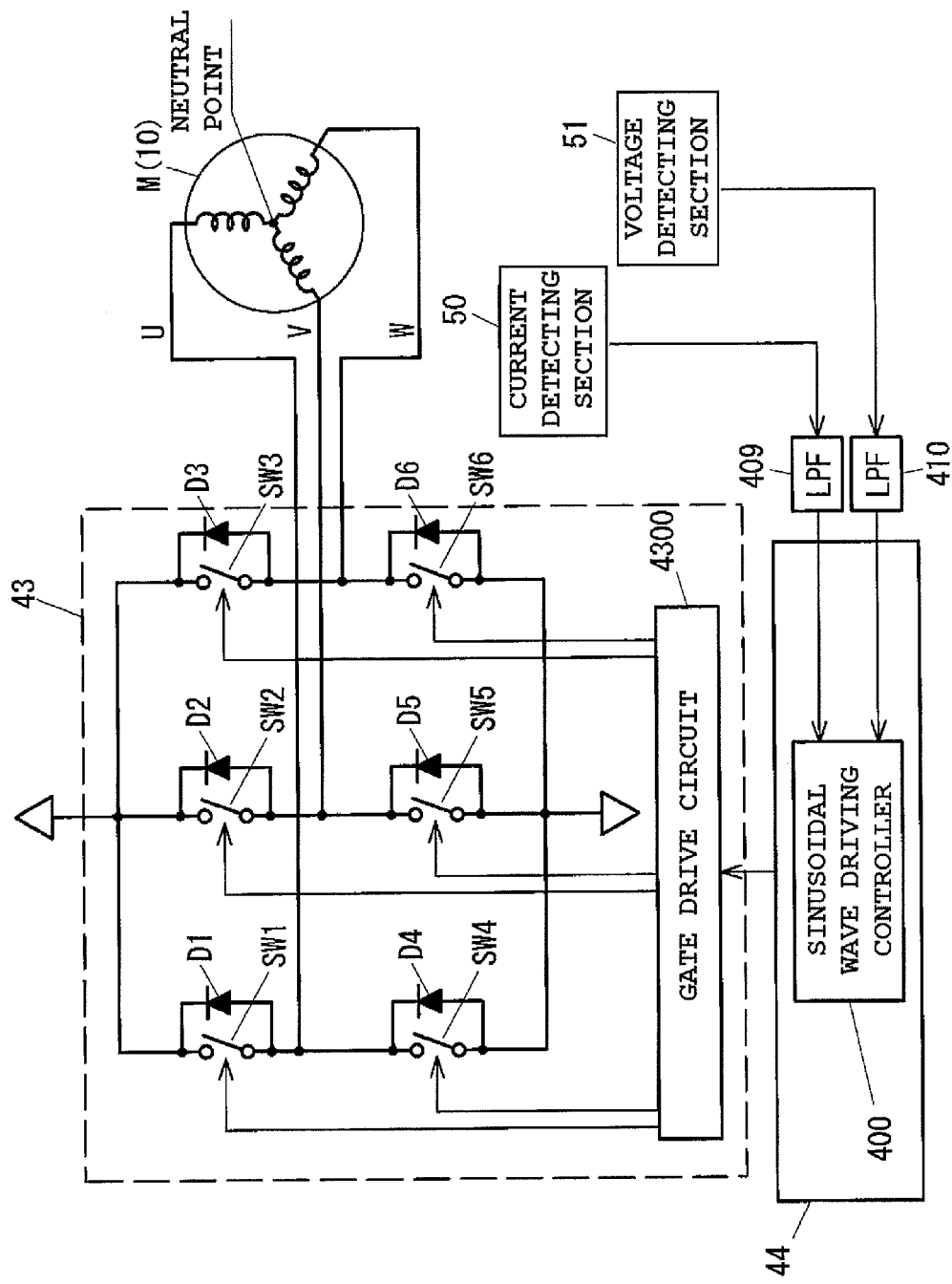
FIG. 3 is a diagram illustrating a motor driving control system relating to a motor.

FIG. 3 is a diagram illustrating a motor driving control system relating to the motor M. The motor driving control system has a sinusoidal wave driving controller 400 and the inverter 43. The inverter 43 has a plurality of the switching elements SW1 to SW6, and a gate drive circuit 4300 for driving the switching elements SW1 to SW6 to the ON/OFF state. Power semiconductor elements such as MOSFET and IGBT are used as the switching elements SW1 to SW6. Reflux diodes D1 to D6 are connected to the switching elements SW1 to SW6 in parallel, respectively.

Currents flowing in U, V and W-phase coils of the motor stator 10 are detected by a current detecting section 50, and current detection signals as detected results are input into the sinusoidal wave driving controller 400 of the controller 44 via a low-pass filter 409. Further, voltages of terminal and neutral point of the U, V and W-phase coils are detected by a voltage detecting section 51, and voltage detection signals as detected results are input into the sinusoidal wave driving controller 400 via a low-pass filter 410.

The sinusoidal wave driving controller 400 generates a PWM control signal for controlling ON/OFF of the switching elements SW1 to SW6 based on the current detection signals and the voltage detection signals from which noises are removed by the low-pass filters 409 and 410. The gate drive circuit 4300 generates a gate driving signal based on the PWM control signal, and turns on/off the switching elements SW1 to SW6. As a result, the voltages that are modulated into a sinusoidal wave and undergo PWM are applied to the U, V and W-phase coils.

In this embodiment, a rotational speed and a magnetic pole position are estimated based on motor current detection signals and motor voltage detection signals. In a case of a sensorless motor without a rotation sensor for detecting a rotating position of the motor rotor 11 like this embodiment, the rotational speed and the magnetic pole position are generally estimated based on the motor current detection signals and the motor voltage detection signals.

Figure 4:
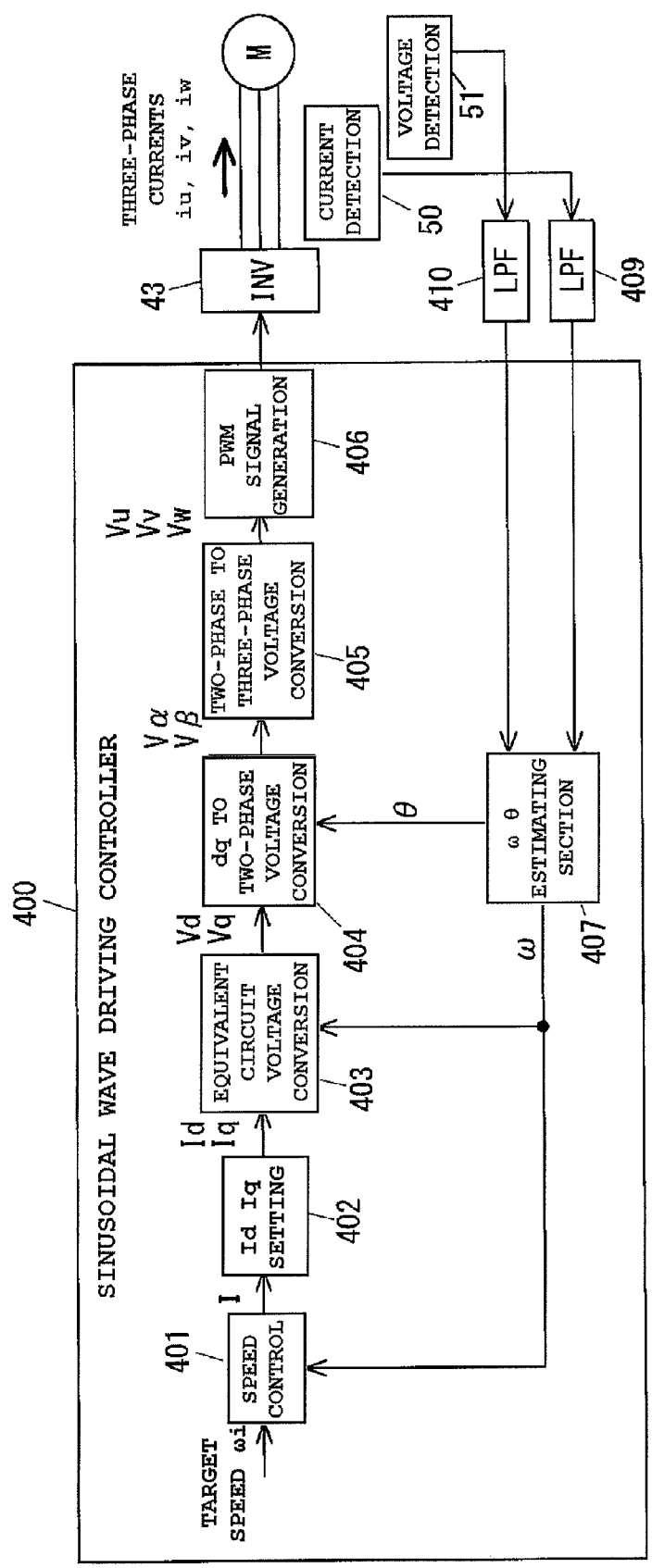
FIG. 4 is a block diagram describing a sinusoidal wave driving controller.

FIG. 4 is a block diagram describing the sinusoidal wave driving controller 400. As described with reference to FIG. 3, a three-phase current flowing in the motor M is detected by the current detecting section 50, and a detected current detection signal is input into the low-pass filter 409. On the other hand, a three-phase voltage of the motor M is detected by the voltage detecting section 51, and a detected voltage detection signal is input into the low-pass filter 410.

The current detection signals that pass through the low-pass filter 409 and the voltage detection signals that pass through the low-pass filter 410 are input into a rotational speed and magnetic pole position estimating section 407. Though details are described later, the rotational speed and magnetic pole position estimating section 407 estimates a rotational speed ω and a magnetic pole position (an electrical angle θ) of the motor M. based on the current detection signals and the voltage detection signals. Since the magnetic pole position is expressed by the electrical angle θ, hereinafter, the magnetic pole position is called as a magnetic pole electrical angle θ. The calculated rotational speed ω is input into a speed controller 401 and the equivalent circuit voltage converting section 403. Further, the calculated magnetic pole electrical angle θ is input into a dq to two-phase voltage converting section 404.

Figure 5:
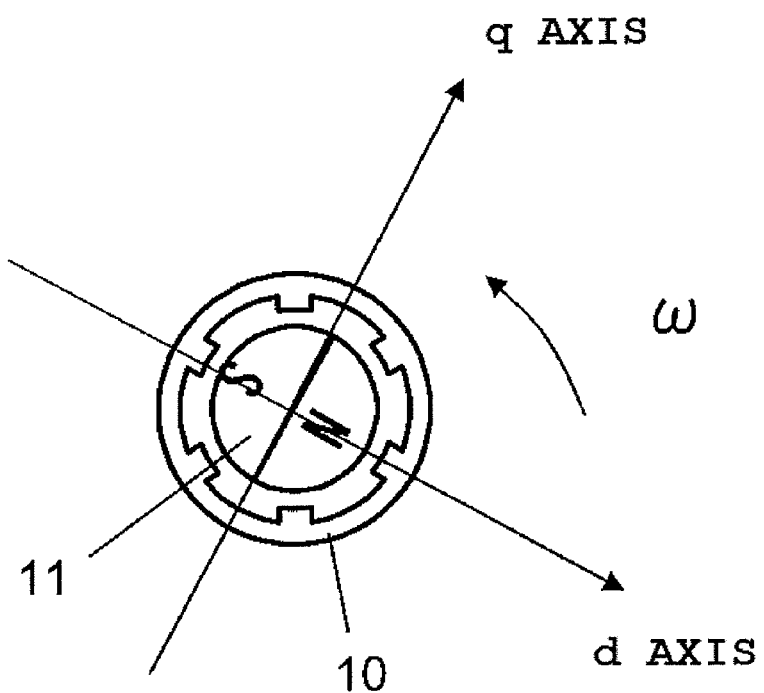
FIG. 5 is a diagram describing directions of d axis and q axis.

The speed controller 401 makes PI control (proportional control and integral control) or P control (proportional control) based on a difference between an input target rotational speed coi and the estimated present rotational speed ω so as to output a current command I. The Id and Iq setting section 402 sets current commands Id and Iq in a rotating coordinate dq system based on the current command I. As shown in FIG. 5, a d axis of the rotating coordinate dq system is a coordinate axis in which an N pole of the rotating motor rotor 11 is a positive direction. The q axis is a coordinate axis that advances by 90° and is at a right angle to the d axis, and its direction is a direction of a counter electromotive voltage.

The equivalent circuit voltage converting section 403 converts the current commands Id and Iq into voltage commands Vd and Vq in the rotating coordinate dq system using the rotational speed ω calculated by the rotational speed and magnetic pole position estimating section 407 and Formula (1) based on an electric equivalent circuit constant of the motor M.

$$\begin{pmatrix} Vd \\ Vq \end{pmatrix} = \begin{pmatrix} r & -\omega L \\ \omega L & r \end{pmatrix} \begin{pmatrix} Id \\ Iq \end{pmatrix} \quad (1)$$

The dq to two-phase voltage converting section 404 converts the voltage commands Vd and Vq in the rotating coordinate dq system into voltage commands Vα and Vβ in a fixed coordinate αβ system based on the converted voltage commands Vd and Vq and the magnetic pole electrical angle θ input from the rotational speed and magnetic pole position estimating section 407. A two-phase to three-phase voltage converting section 405 converts the two-phase voltage commands vα and vβ into three-phase voltage commands Vu, Vv and Vw. A PWM signal generating section 406 generates a PWM control signal for turning on/off (conductive or cut off) the six switching elements SW1 to SW6 provided to the inverter 43 based on the three-phase voltage commands Vu, Vv and Vw. The inverter 43 turns on/off the switching elements SW1 to SW6 based on the PWM control signal input from the PWM. signal generating section 406 so as to apply a driving voltage to the motor M.

Details of the rotational speed and magnetic pole position estimating section 407 are described below with reference to the block diagrams shown in FIGS. 4 and 6. Phase voltage detection signals vv, vu and vw output from the voltage detecting section 51 are input into a three-phase to two-phase converting section 4072 via the low-pass filter 410. The three-phase to two-phase converting section 4072 converts three-phase voltage signals into two-phase voltage signals vα' and vβ'. The converted voltage signals vα' and vβ' are input into a counter electromotive voltage arithmetic section 4074.

On the other hand, phase current detection signals iv, iu and iw output from the current detecting section 50 are input into a three-phase to two-phase converting section 4071 via the low-pass filter 409. The three-phase to two-phase converting section 4071 converts three-phase current detection signals iv, iu and iw into two-phase current signals iα and iβ. The converted current signals iα and iβ are input into an equivalent circuit voltage converting section 4073.

The equivalent circuit voltage converting section 4073 converts the current signals iα and iβ into voltage signals vα and vβ using following Formula (2) based on the electric equivalent circuit constant of the motor M. The converted voltage signals vα and vβ are input into a counter electromotive voltage arithmetic section 4074. The equivalent circuit is divided into a resistance component r and an inductance component L of a motor coil. The values r and L are obtained from motor specifications or the like and they are stored in a storage section (not shown) in advance.

$$\begin{pmatrix} v\alpha \\ v\beta \end{pmatrix} = \begin{pmatrix} r & -\omega L \\ \omega L & r \end{pmatrix} \begin{pmatrix} i\alpha \\ i\beta \end{pmatrix} \quad (2)$$

The counter electromotive voltage arithmetic section 4074 calculates counter electromotive voltages Eα and Eβ using following Formula (3) according to the voltage signals vα' and vβ' based on motor three-phase voltages and the voltage signals vα and vβ based on motor three-phase currents.

$$\begin{pmatrix} E\alpha \\ E\beta \end{pmatrix} = \begin{pmatrix} v\alpha' \\ v\beta' \end{pmatrix} - \begin{pmatrix} v\alpha \\ v\beta \end{pmatrix} \quad (3)$$

Figure 6:
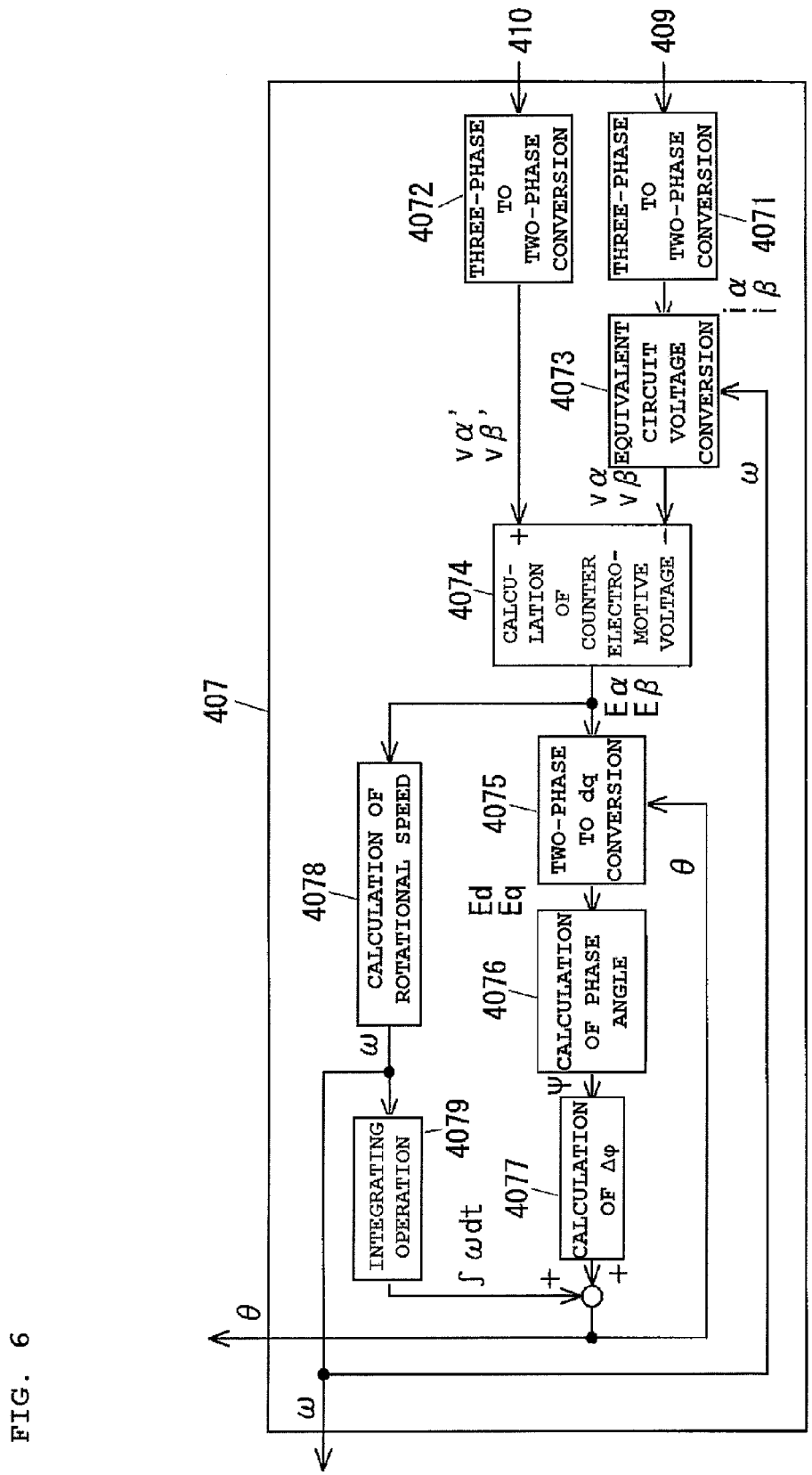
FIG. 6 is a block diagram describing details of a rotational speed and magnetic pole position estimating section.

In this embodiment shown in FIG. 6, after the counter electromotive voltage arithmetic section 4074 calculates the counter electromotive voltages Eα and Eβ, the rotational speed ω and a magnetic pole phase shift correcting amount Δφ are calculated based on the counter electromotive voltages Eα and Eβ, and an angle θ is estimated from the rotational speed ω and the magnetic pole phase shift correcting amount Δφ. At this time, the calculation of the rotational speed ω and the calculation of the magnetic pole phase shift correcting amount Δφ are made independently.

The rotational speed ω is an amount relating to periodicity of the magnetic pole electrical angle θ. On the other hand, the magnetic pole phase shift correcting amount Δφ is an amount relating to a phase shift between an actual magnetic pole electrical angle θr and an estimated magnetic pole electrical angle θ. The magnetic pole electrical angle θ is calculated based on the calculated rotational speed ω and magnetic pole phase shift correcting amount Δφ according to θ=∫ωdt+Δφ.

(Calculation of the Magnetic Pole Phase Shift Correcting Amount Δφ)

The calculation of the magnetic pole phase shift correcting amount Δφ is described. The rotational speed of a motor rotor 11 does not abruptly change in one rotational period due to rotary inertia of the rotor, and thus changes slowly in at least several periods, and this can be regarded as a stationary response. Therefore, a two-phase to dq voltage converting section 4075 converts the input counter electromotive voltages (Eα and Eβ) into counter electromotive voltages (Ed and Eq) in the rotating coordinate dq system by conversion expressed by Formula (4). The magnetic pole electrical angle θ calculated at previous calculation timing in the calculation made at predetermined time intervals is fed back to the angle θ in Formula (4).

$$\begin{pmatrix} Ed \\ Eq \end{pmatrix} = \begin{pmatrix} \cos\theta & \sin\theta \\ -\sin\theta & \cos\theta \end{pmatrix} \begin{pmatrix} E\alpha \\ E\beta \end{pmatrix} \quad (4)$$

Figure 10:
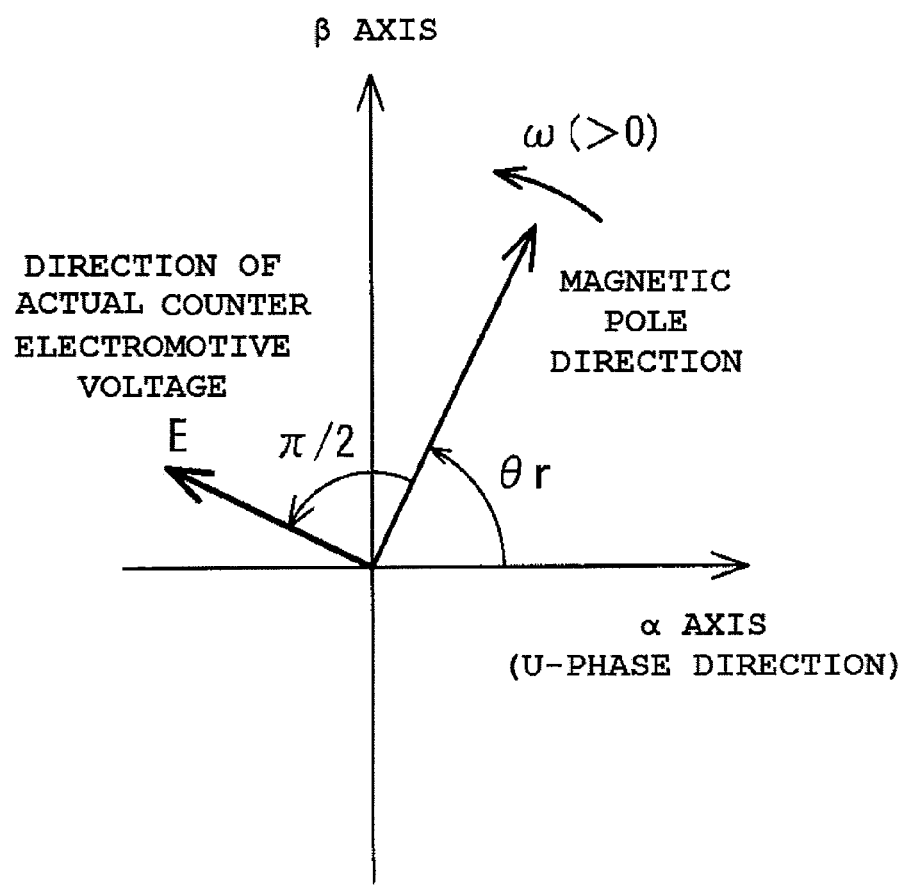
FIG. 10 is a diagram illustrating an actual counter electromotive voltage and a magnetic pole electrical angle θr in a fixed coordinate αβ system.

Coordinate conversion using complex notation is as follows. An α component Eα and a β component Eβ of the counter electromotive voltages (Eα and Eβ) correspond to a real part and an imaginary part of E×exp(j(θr+π/2)), when ω>0. E represents a level of a counter electromotive voltage, and θr represents the actual magnetic pole electrical angle. FIG. 10 is a diagram illustrating the counter electromotive voltage and the magnetic pole electrical angle θr in the fixed coordinate αβ system. Since the direction of the counter electromotive is voltage advances by 90 deg (π/2rad) with respect to the magnetic pole electrical angle θr, the magnetic pole electrical angle θr is such that θr=a tan(-Eα/Eβ). The direction of the counter electromotive voltage and the direction of the magnetic pole rotate at the rotational speed ω.

Figure 11:
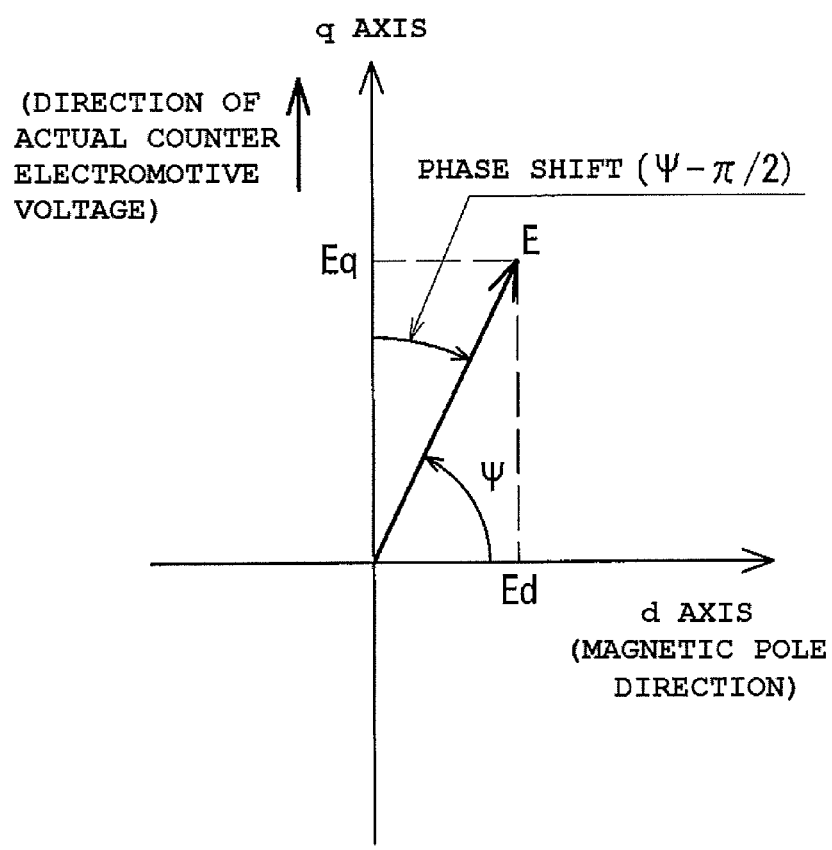
FIG. 11 is a diagram describing a phase shift in a rotating coordinate dq system.

On the contrary, two-phase to dq coordinate conversion to which the estimated magnetic pole electrical angle θ is applied is expressed by multiplying E×exp(j(θr+π/2)) by exp(−jθ). Therefore, the counter electromotive voltages (Ed and Eq) in the rotating coordinate dq system are expressed by E×exp(j(θr+π/2−θ)). FIG. 11 is a diagram describing a phase shift in the rotating coordinate dq system, and the direction of the magnetic pole matches with the d axis. A phase Ψ is expressed such that Ψ=θr+π/2−θ, and is calculated according to Ψ=atan (Eq/Ed). A phase angle arithmetic section 4076 in FIG. 6 calculates the phase angles Ψ of the counter electromotive voltages (Ed and Eq) in the rotating coordinate dq system according to Ψ=atan (Eq/Ed).

When the estimated magnetic pole electrical angle θ matches with the actual magnetic pole electrical angle θr, Ψ=π/2, and the direction of the counter electromotive voltages matches with the q axis. On the other hand, when θr≠θ, as shown in FIG. 11, θr−θ=Ψ−π/2 occurs as a phase shift. In FIG. 11, θr<θ because Ψ−π/2<0, and the estimated magnetic pole electrical angle θ is estimated so as to be larger than the actual magnetic pole electrical angle θr (advance phase). The phase angle Ψ calculated according to Ψ=a tan (Eq/Ed) is controlled so that (Ψ−π/2)→0, and thus the estimated magnetic pole electrical angle θ can be converged to the actual magnetic pole electrical angle θr.

A correcting amount Δφ arithmetic section 4077 calculates the magnetic pole phase shift correcting amount Δφ for correcting the magnetic pole phase shift. The magnetic pole phase shift correcting amount Δφ is generated by multiplication of a suitable gain g1 (a gain of proportional control or a gain of proportional control·integral control) based on a value of Ψ−π/2(rad) (a change amount of the positive and negative rotation) as expressed by Formula (5). According to Formula (5), when Ψ−π/2<0 (θr<θ), Δφ<0 as shown in FIG. 11. That is to say, the magnetic pole electrical angle θ that advances with respect to the actual magnetic pole electrical angle θr is shifted to a minus side.

Δφ=g1×(Ψ−π/2): in a case where Ψ−π/2≠0

Δφ=0: in a case where Ψ−π/2=0     (5)

(Calculation of the Rotational Speed ω)

Figure 7:
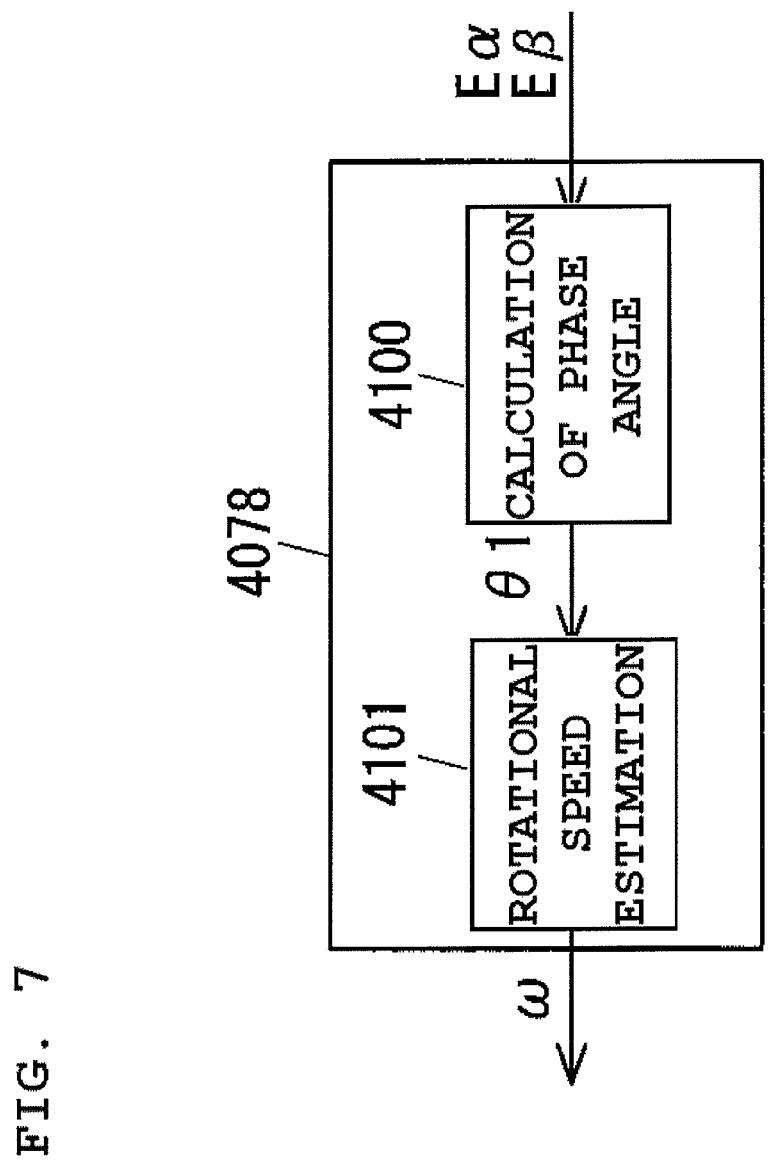
FIG. 7 is a block diagram illustrating one example of an estimating operation in a rotational speed arithmetic section.

On the other hand, separately from the calculation of the magnetic pole phase shift correcting amount Δφ, a rotational speed arithmetic section 4078 makes estimating calculation of the rotational speed ω. An integration operating section 4079 calculates an integrated value ∫ωdt of the rotational speed ω. FIG. 7 is a block diagram illustrating one example of an estimating operation in a rotational speed arithmetic section 4078.

A phase angle arithmetic section 4100 calculates phase angles θ1 of the counter electromotive voltages (Eα and Eβ) using Formula (6) based on the counter electromotive voltages (Eα and Eβ) input from the counter electromotive voltage arithmetic section 4074. The phase angle θ1 represents the direction of the magnetic pole (magnetic pole position) in FIG. 10.

$$\theta 1 = \tan^{-1}(-E\alpha/E\beta) \quad (6)$$

In the fixed coordinate αβ system shown in FIG. 10, since the rotation in the magnetic pole direction is made at the rotational speed ω, the phase angle θ1 in Formula (6) also changes temporally. A rotational speed estimating section 4101 calculates differential or difference of the phase angle θ1 that changes in such a manner, so as to calculate (estimate) the rotational speed ω. When the difference is applied, a present phase angle θ1 is calculated this time when arithmetic is repeated at a control sampling time T, and a phase angle θ1 calculated at each predetermined time T1 that is a natural number multiple of T is stored as past (previous) phase angles in advance, so that a difference Δθ1 between the present phase angle and the past phase angle is calculated. The difference Δθ1 is divided by a time T1 as a difference interval so that the rotational speed ω (=Δθ1/T1) is calculated.

The rotational speed ω calculated by the rotational speed arithmetic section 4078 is input into the integration operating section 4079 and the equivalent circuit voltage converting section 4073, and is output from a rotational speed and magnetic pole position estimating section 407. The integration operating section 4079 calculates an integrated value of the rotational speed ω. When the integrated value is expressed by using the control sampling time T, the integrated value (next time)=the integrated value (present value)+ω×T. A sum (following Formula (7)) of the integrated value and the magnetic pole phase shift correcting amount Δφ calculated by the correcting amount Δφ arithmetic section 4077 is input, as the magnetic pole electrical angle θ at next control timing after the time T passes from this control timing, into the two-phase to dq voltage converting section 4075, and is output from the rotational speed and magnetic pole position estimating section 407.

θ(next time)=integrated value(next time)+Δφ     (7)

Second Embodiment

Figure 8:
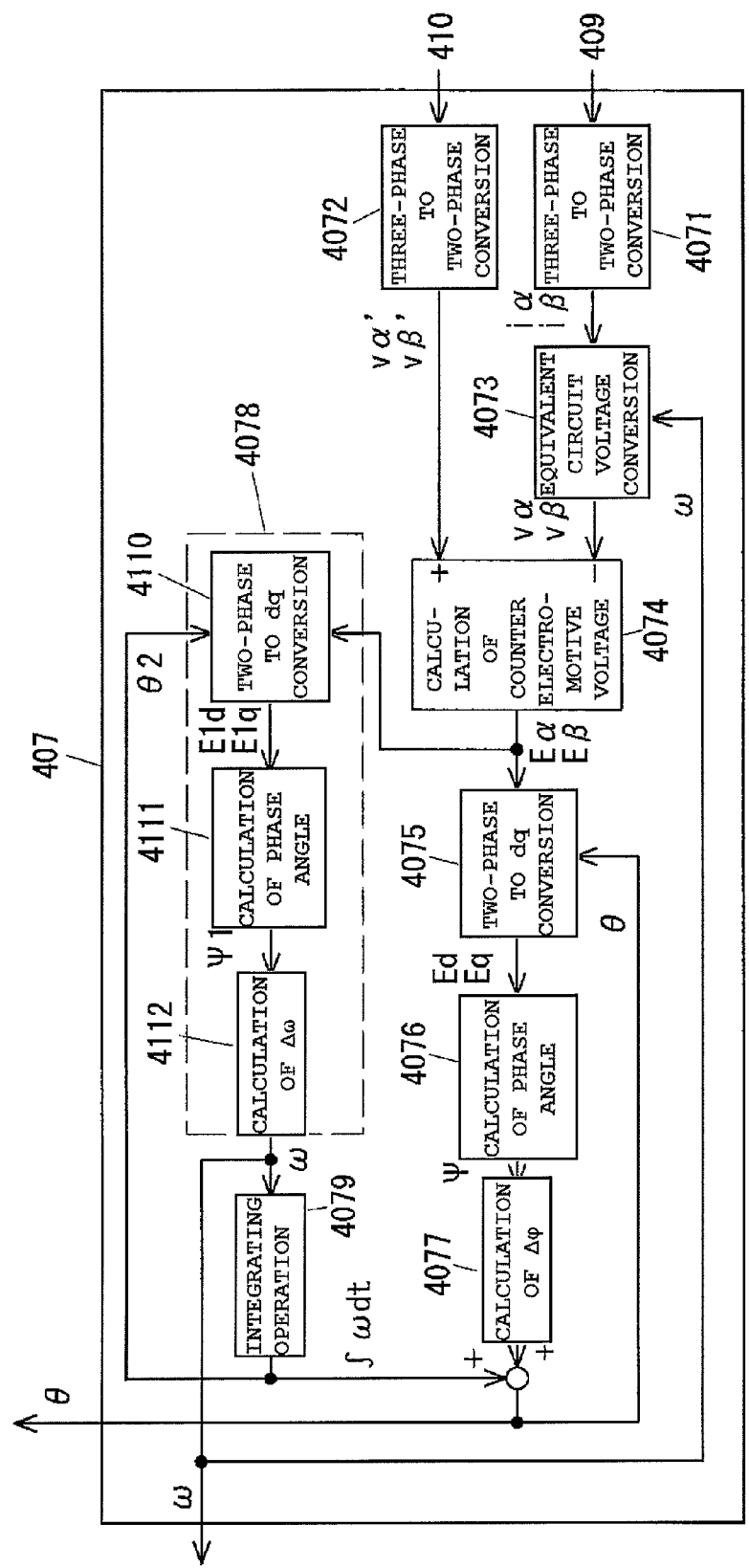
FIG. 8 is a diagram illustrating a second embodiment.

FIG. 8 is a diagram illustrating a second embodiment. The second embodiment is different from the first embodiment shown in FIGS. 6 and 7 in a constitution of the rotational speed arithmetic section 4078, and that an integrated value of a rotational speed ω calculated by an integration arithmetic section is fed back to a rotational speed arithmetic section 4078. Parts different from the first embodiment are described below.

A two-phase to dq voltage converting section 4110 of a rotational speed arithmetic section 4078 calculates counter electromotive voltages (E1d and E1q) in a rotating coordinate dq system using following Formula (8) based on the counter electromotive voltages (Eα and Eβ) input from a counter electromotive voltage arithmetic section 4074 and an integrated value θ2 output from an integration operating section 4079. The integrated value (electrical angle) θ2 to be used here is the magnetic pole electrical angle whose magnetic pole phase shift is not corrected by a magnetic pole phase shift correcting amount Δφ differently from a magnetic pole electrical angle θ to be used in a two-phase to dq voltage converting section 4075.

$$\begin{pmatrix} E1d \\ E1q \end{pmatrix} = \begin{pmatrix} \cos\theta 2 & \sin\theta 2 \\ -\sin\theta 2 & \cos\theta 2 \end{pmatrix} \begin{pmatrix} E\alpha \\ E\beta \end{pmatrix} \quad (8)$$

A phase angle arithmetic section 4111 calculates a phase angle Ψ1 using following Formula (9). As described in FIGS. 7 and 10, in a fixed coordinate αβ system, counter electromotive voltage vectors (Eα and Eβ) rotate at the rotational speed ω. On the other hand, in a case where the actual magnetic pole electrical angle θr and the estimated magnetic pole electrical angle θ have the same periodicity, even if a phase shift occurs, the rotational speed ω to be estimated in the rotating coordinate dq system converges to the actual rotational speed ωr. As a result, the phases Ψ1 of the counter electromotive voltages (E1d and E1q) that are subject to two-phase to dq voltage conversion have a constant value. On the contrary, when not converge, the phases Ψ1 change.

$$\Psi 1 = \tan^{-1}(E1q/E1d) \quad (9)$$

A rotational speed shift correcting section 4112 calculates a correcting amount Δω (=ω(next time)−ω(present value)) for correcting rotational speed shift based on a change ΔΨ1 in the phase Ψ1. The correcting amount Δω is generated by multiplication of a suitable gain g2 (a gain of proportional control or a gain of proportional control·integral control) based on the value of ΔΨ1 (a change amount in the positive or negative rotation) as expressed in Formula (10). Since the change in the phase Ψ1 is proportional to the rotational speed shift (ωr−ω), when ωr>ω, ΔΨ1>0, and the correcting amount Δω acts to increase the rotational speed.

Δω=g2×ΔΨ1: in a case where ΔΨ1≠0

$$\Delta\omega = 0: \text{ in a case where } \Delta\Psi 1 = 0 \quad (10)$$

Further, the rotational speed shift correcting section 4112 adds the calculated correcting amount Δω to the rotational speed ω (present value) currently used so as to calculate the rotational speed ω (next time) of next timing (Formula (11)). The correction is made successively in each sampling period by using Formula (11), so that the rotational speed ω can be converged to the true rotational speed ωr. In such a converging process, since the steady-state error (offset) is controlled to be zero, the steady-state error that is a conventional problem can be minimum.

$$\omega(\text{next time}) = \omega(\text{present value}) + \Delta\omega \quad (11)$$

The integration operating section 4079 calculates an integrated value ∫ωdt based on the rotational speed ω output from the rotational speed shift correcting section 4112. This integrated value ∫ωdt is added to a magnetic pole phase shift correcting amount Δφ calculated by a correcting amount Δω arithmetic section 4077, so that the magnetic pole electrical angle (next time) θ is obtained. Further, the integrated value ∫ωdt is fed back as an electrical angle θ2 so as to be input into a two-phase to dq voltage converting section 4110.

As shown in FIG. 8, in the second embodiment, the rotational speed arithmetic section 4078 carries out two-phase to dq voltage conversion using the magnetic pole electrical angle θ2 that does not include the magnetic pole phase shift correcting amount Δφ. Therefore, a description is given on a different point in a case where the magnetic pole electrical angle θ to which the magnetic pole phase shift correcting amount Δφ and the integrated value ∫ωdt are added is used, with reference to FIG. 12 illustrating a comparative example.

Figure 12:
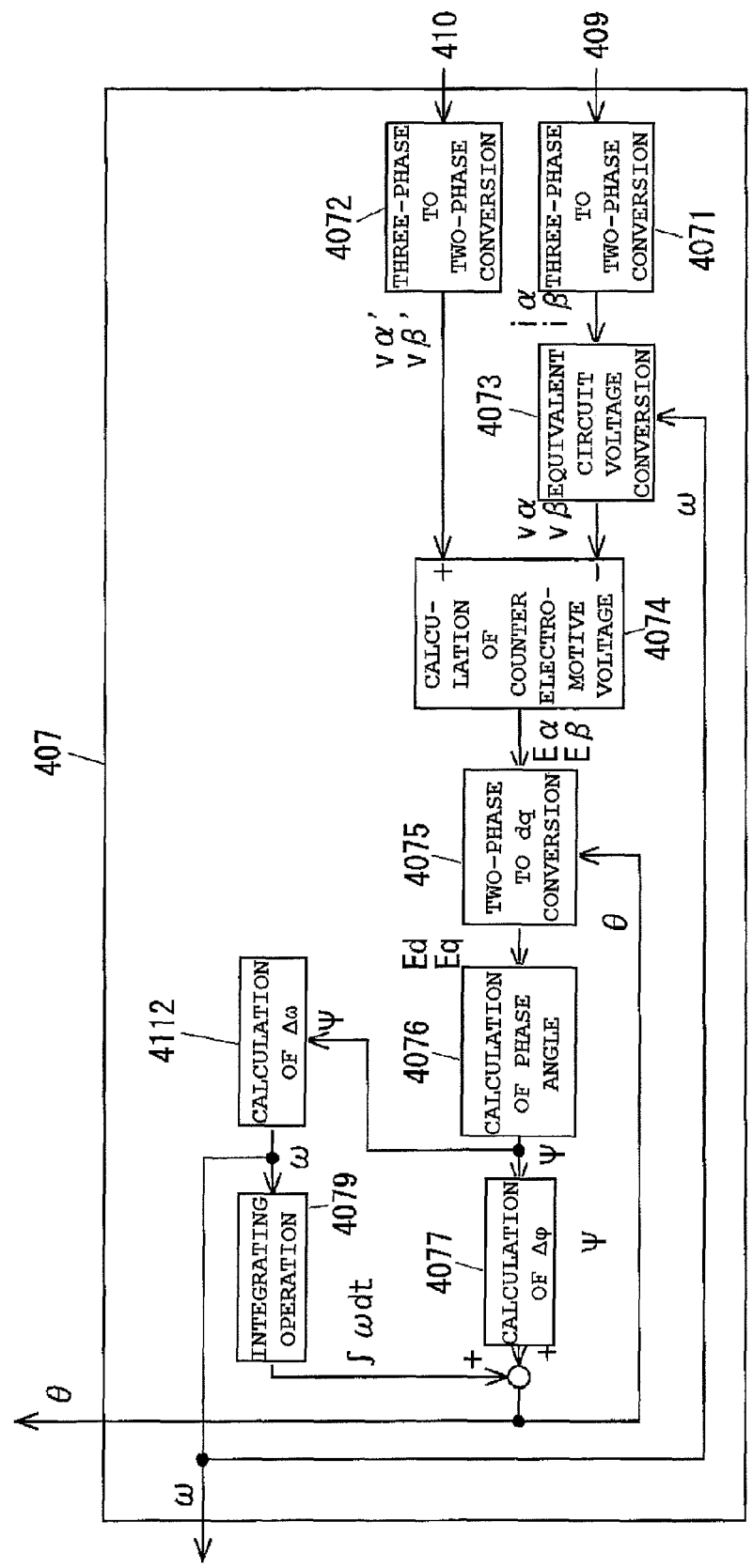
FIG. 12 is a block diagram in a case where a rotational speed ω is estimated by using a magnetic pole electrical angle θ.

FIG. 12 is a diagram where the block diagram of FIG. 8 is replaced by a case where the rotational speed ω is estimated by using the magnetic pole electrical angle θ. For this reason, a phase angle Ψ output from a phase angle arithmetic section 4076 is input into the rotational speed shift correcting section 4112. In such a constitution, since the magnetic pole electrical angle θ to be applied to the two-phase to dq conversion is constituted by the rotational speed ω (the integrated value ∫ωdt) and the magnetic pole phase shift correcting amount Δφ, when an estimated error of the magnetic pole phase shift correcting amount Δφ is large, the error has an effect on the magnetic pole electrical angle θ. The error is fed back to next two-phase to dq conversion, and has an effect on not only subsequent calculation of a correcting amount Δφ but also calculation of the rotational speed ω. Such an increase in the error due to mutual interference deteriorates the driving stability of the motor, and thus step-out easily occurs.

In the second embodiment, in order to prevent the deterioration in the safety due to the increase in the error, the magnetic pole electrical angle θ (=∫ωdt+Δφ) is applied to the calculation of the magnetic pole phase shift correcting amount Δφ, and the magnetic pole electrical angle θ2 (=∫ωdt) that does not include the magnetic pole phase shift correcting amount Δφ is applied to the calculation of the rotational speed ω. This is because the rotational speed ω is calculated based on the difference and differential of the phase angles Ψ1, and thus the calculation needs only periodicity information.

Third Embodiment

Figure 9:
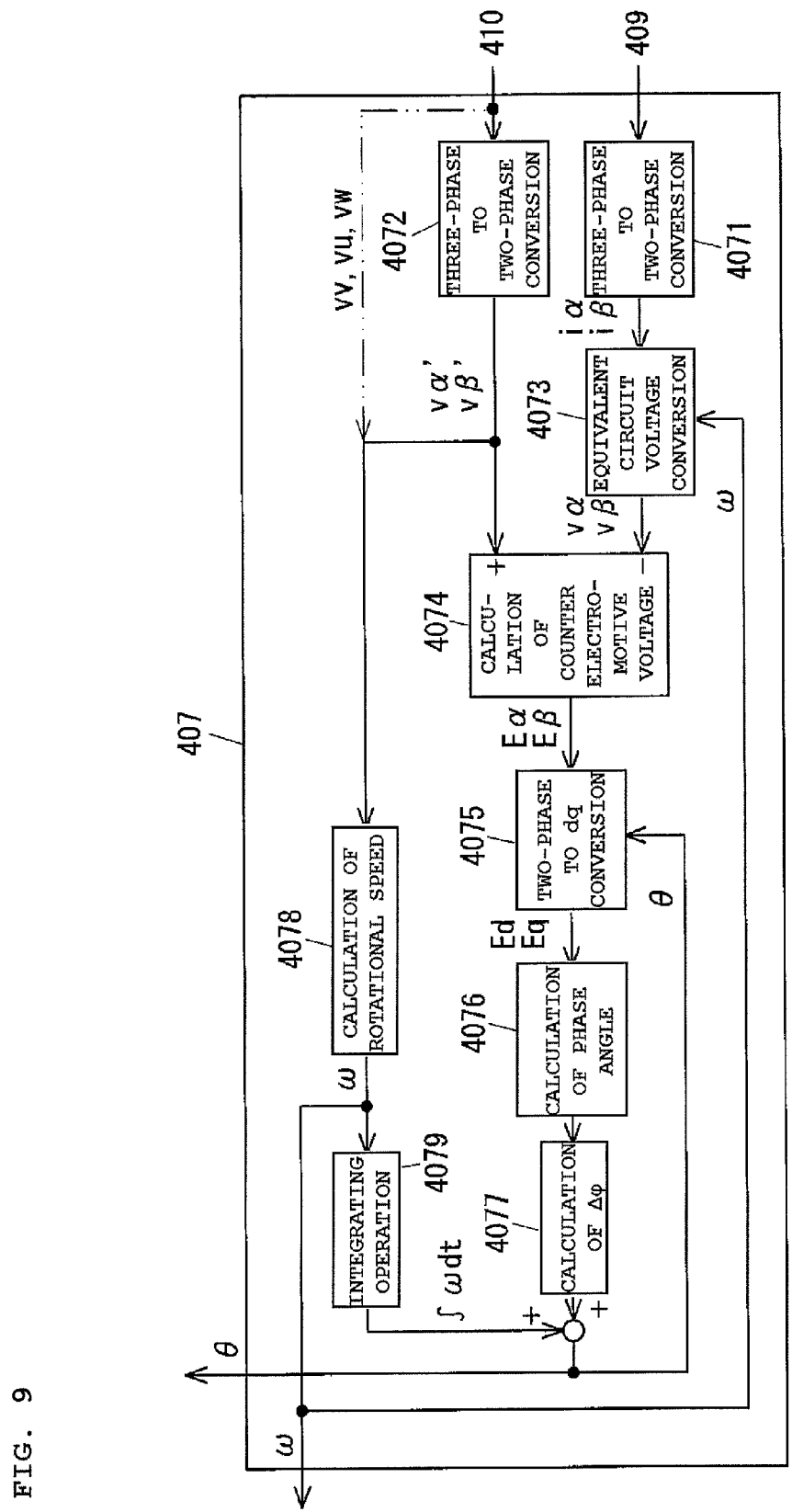
FIG. 9 is a diagram illustrating a third embodiment.

FIG. 9 is a diagram illustrating a third embodiment. In the first embodiment, a rotational speed ω is obtained based on the periodicity of counter electromotive voltages (Eα and Eβ) calculated by a counter electromotive voltage arithmetic section 4074. In the third embodiment, two-phase voltage (vα' and vβ') signals and three-phase voltage (vu, vv and vw) signals for obtaining similar rotation periodic signals are used instead of the counter electromotive voltages (Eα and Eβ). A sinusoidal voltage is applied to a motor coil, and all signals are ac signals, but a rotational speed arithmetic section 4078 counts a time between zero crosses of these signals or a time between an amplitude maximum point and an amplitude minimum point so as to obtain a period, and calculates the rotational speed ω.

For example, a case where the time between zero crosses is counted by applying the Vu signal is described more concretely. A threshold close to 0 with respect to a voltage absolute value of Vu is predetermined. When the voltage is less than the threshold, the voltage is regarded as 0 and a counter variable is reset to 0, and when the voltage is equal to or more than the threshold, 1 is added to the counter variable. Further, the arithmetic for maintaining the counter variable just before resetting as C until next reset timing is made at each control sampling time T. Since C*T becomes a half of the rotational speed period, the rotational speed is determined according to ω=π/(C*T). Further, smoothing may be carried out by inserting a moving average process.

The other parts of the constitution relating to the calculation of the rotational speed ω are similar to the first embodiment, and thus the description thereof is omitted. The third embodiment is inferior in stability in comparison with the first and second embodiments where the rotational speed is calculated by applying the counter electromotive voltages, but can produce the similar effect to that in the first embodiment.

Fourth Embodiment

Figure 13:
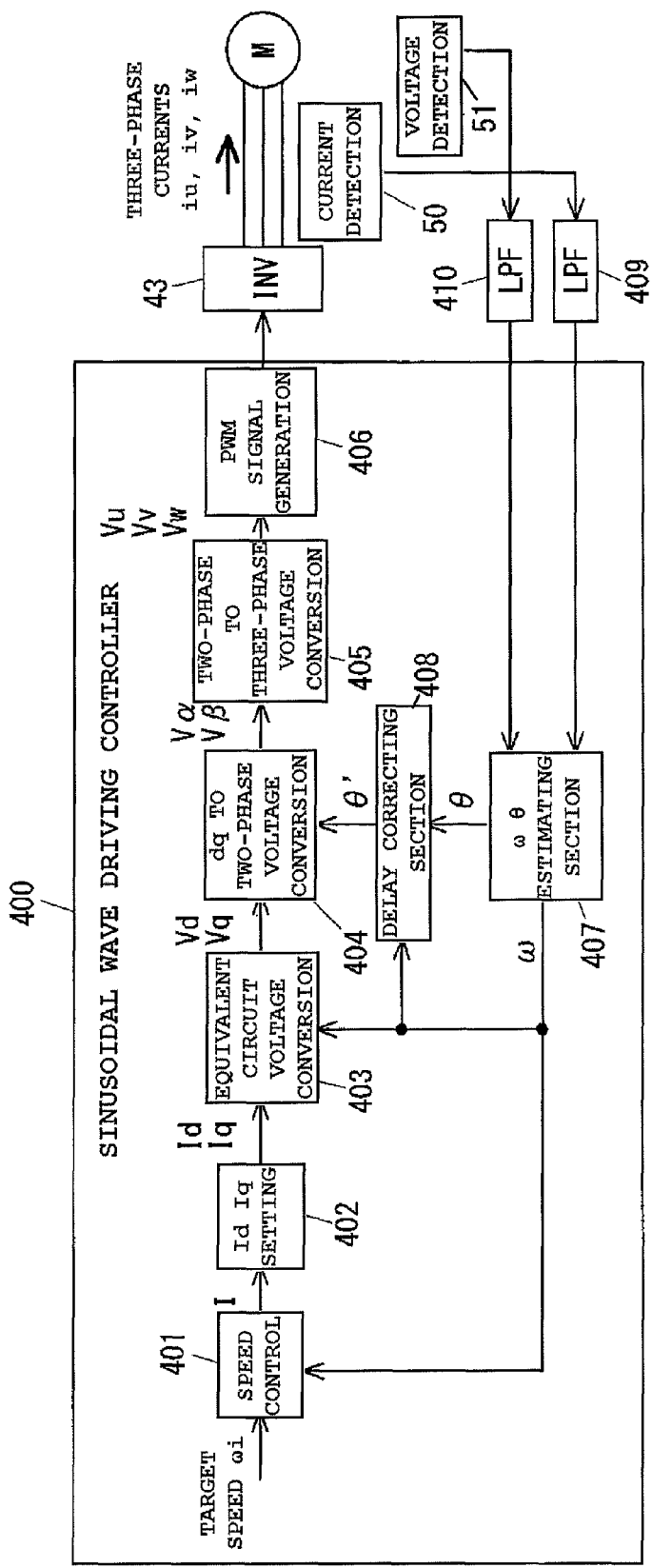
FIG. 13 is a block diagram describing the sinusoidal wave driving controller according to a fourth embodiment.

FIG. 13 is a block diagram describing a sinusoidal wave driving controller 400 according to a fourth embodiment. The sinusoidal wave driving controller 400 shown in FIG. 13 is different from that in the block diagram of FIG. 4 in that a delay correcting section 408 is provided. The part relating to the delay correcting section 408 that is different from FIG. 4 is described below, and description about the other common parts are omitted.

A current detection signal detected by a current detecting section 50 is input into a rotational speed and magnetic pole position estimating section 407 via a low-pass filter 409. Similarly, a voltage detection signal detected by a voltage detecting section 51 is input into the rotational speed and magnetic pole position estimating section 407 via a low-pass filter 410. The low-pass filters 409 and 410 are provided in order to remove harmonic noises caused by PWM switching.

Figure 14:
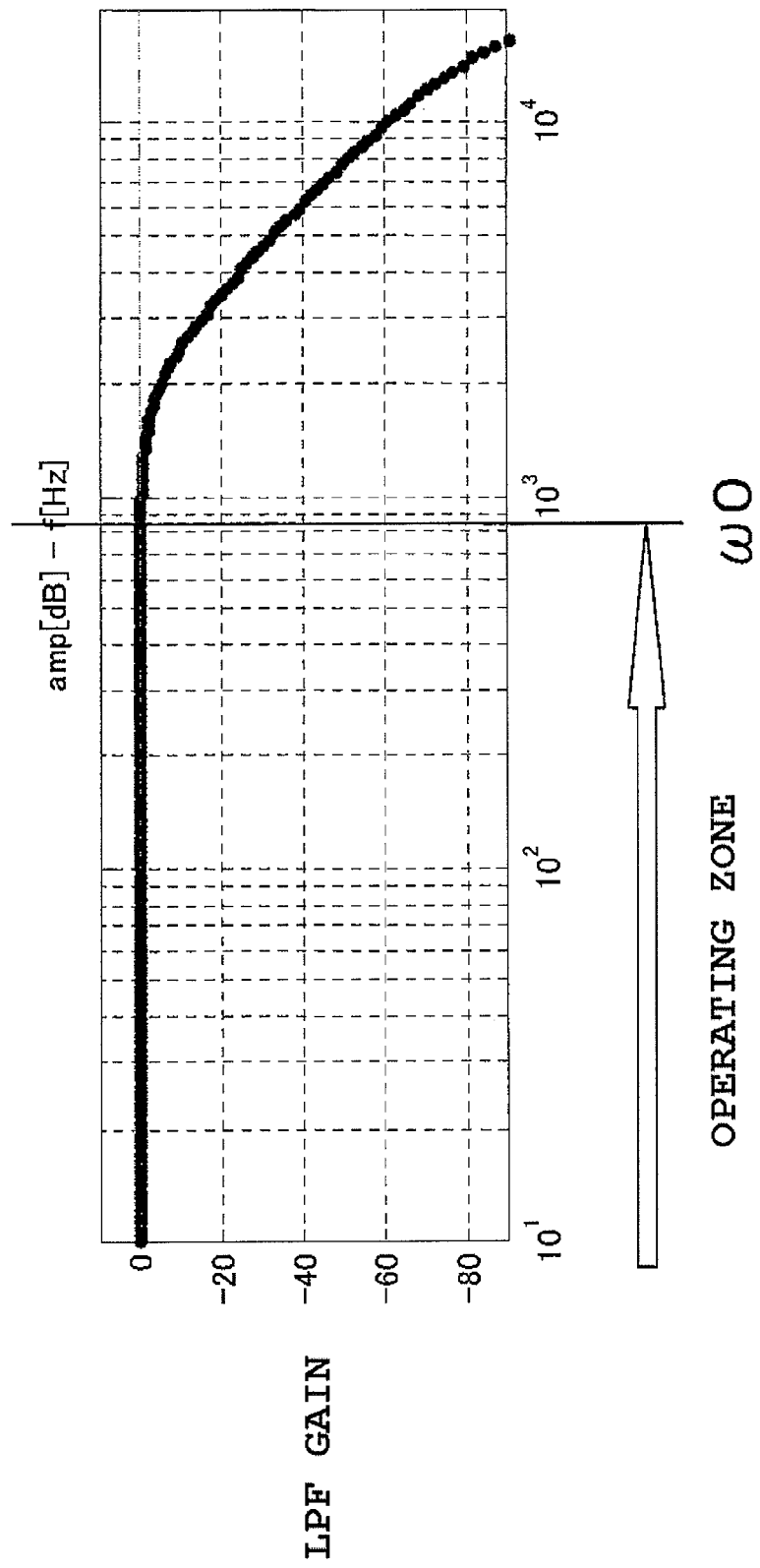
FIG. 14 is a diagram illustrating gain characteristics of a low-pass filter.
Figure 15:
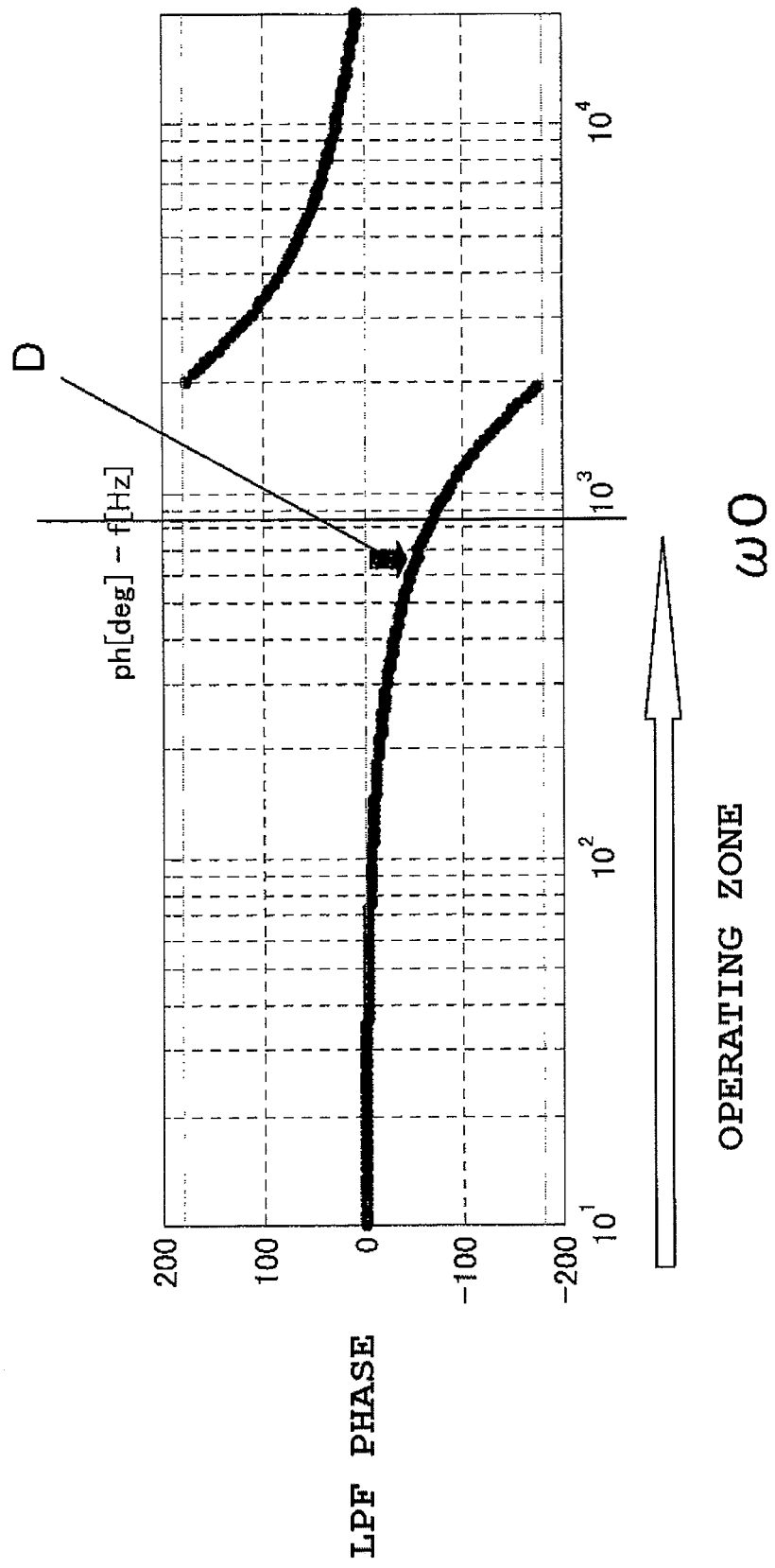
FIG. 15 is a diagram illustrating phase characteristics of the low pass filter.

FIGS. 14 and 15 are diagrams illustrating one example of filter characteristics of the low-pass filter. FIG. 14 is a diagram illustrating a gain, and FIG. 15 is a diagram illustrating a phase. In FIGS. 14 and 15, angular velocities 0 to ω0 are a pump operating zone. In FIG. 15, a minus phase indicated by an arrow D shows a phase delay. In the operating zone, as the rotational speed ω is higher, the phase delay is longer.

In this embodiment, in order to prevent such a problem caused by the phase delay, the delay correcting section 408 for correcting the phase delay is provided. The delay correcting section 408 calculates the corrected magnetic pole electrical angle θ' using following Formula (12) based on the magnetic pole electrical angle θ and the rotational speed ω input from the rotational speed and magnetic pole position estimating section 407.

$$\theta'=\theta+\phi(\omega) \quad (12)$$

Figure 16:
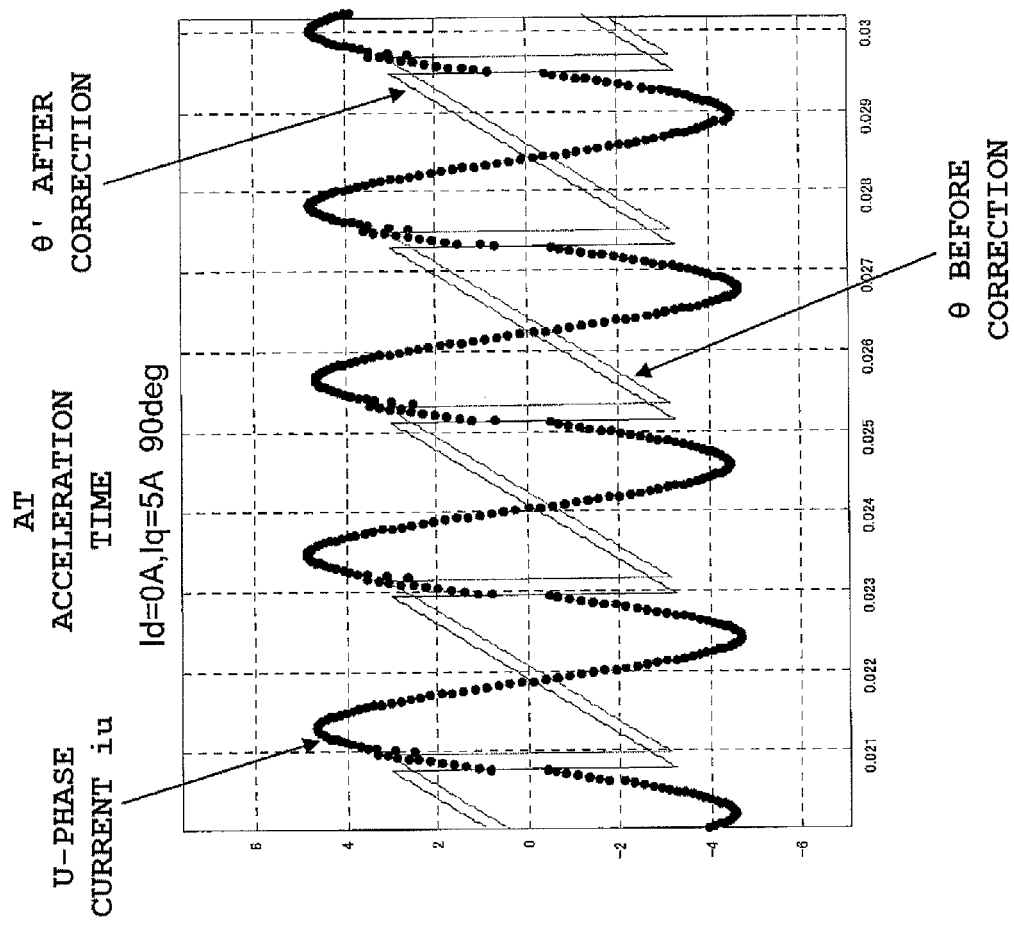
FIG. 16 is a diagram illustrating a U-phase current iu, a pre-correction magnetic pole electrical angle θ, and a corrected magnetic pole electrical angle θ'.

In Formula (12), a leading phase $\phi$ (ω) represents how much the phase leads with respect to the magnetic pole electrical angle θ. The leading phase $\phi(\omega)$ is determined based on filter characteristics shown in FIG. 15. For example, a curved line portion may be approximated by a straight line of constant slope, or the operating zone may be divided into a plurality of zones so that the value may be set for each of zones. Further, the phase delay in a maximum rotational speed (rotational speed at a time of rated rotation) ω0 may be determined as $\phi 0$ (>0), and in a simplified manner, $\phi(\omega)=\phi 0\times(\omega/\omega 0)$. FIG. 16 is a diagram illustrating a U-phase current iu, a pre-correction magnetic pole electrical angle θ, and a corrected magnetic pole electrical angle θ'. A timing at which the corrected magnetic pole electrical angle is such that θ'=0 approximately matches with a timing at which the U-phase current is such that iu=0.

The rotational speed of the motor rotor 11 during the high-speed rotation does not abruptly change in one rotational period due to rotary inertia of the rotor, and thus can only change slowly in at least several periods. For this reason, it can be regarded as stationary response. As a result, comparatively simple means for adding a delay correcting amount $\phi(\omega)$ to the electrical angle θ can produce an effect. The dq to two-phase voltage converting section 404 converts the voltage commands Vd and Vq in the d-q axis rotating coordinate system into voltage commands vα and vβ in the two-axis fixed coordinate system (α-β coordinate system) based on the corrected magnetic pole electrical angle θ' and the converted voltage commands Vd and Vq.

In the fourth embodiment, in addition to the constitutions in the first to third embodiments, the leading phase $\phi$ for correcting the phase delay caused by the filter characteristics of the low-pass filters is calculated, and a PWM control signal is generated based on the corrected magnetic pole electrical angle θ' obtained by adding the leading phase $\phi$ to the magnetic pole electrical angle θ. As a result, the phase delay is reduced, and the motor driving stability can be improved.

Since the current and the voltage have different waveforms, optimum filter characteristics of the low-pass filters 409 and 410 are different from each other. However, it is preferable that the difference of the phase delay is smaller between current detection signals and voltage detection signals input into the rotational speed and magnetic pole position estimating section 407. For this reason, the low-pass filters having the same characteristics are used as the low-pass filters 409 and 410. In this case, the filter characteristics of the low-pass filter 409 is conformed to that of the low-pass filter 410 suitable for removing noises from the voltage detection signals.

Figure 17:
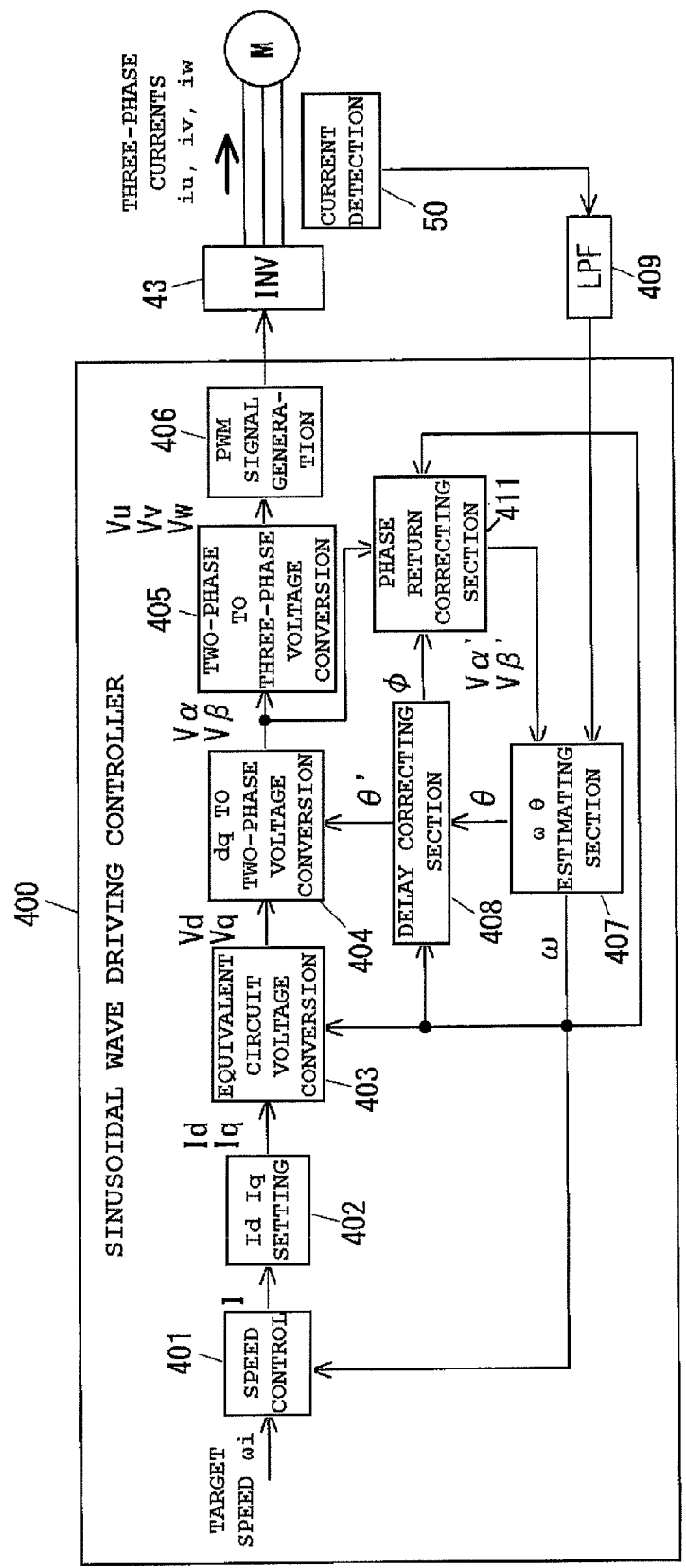
FIG. 17 is a block diagram illustrating the sinusoidal wave driving controller according to a modified example.
Figure 18:
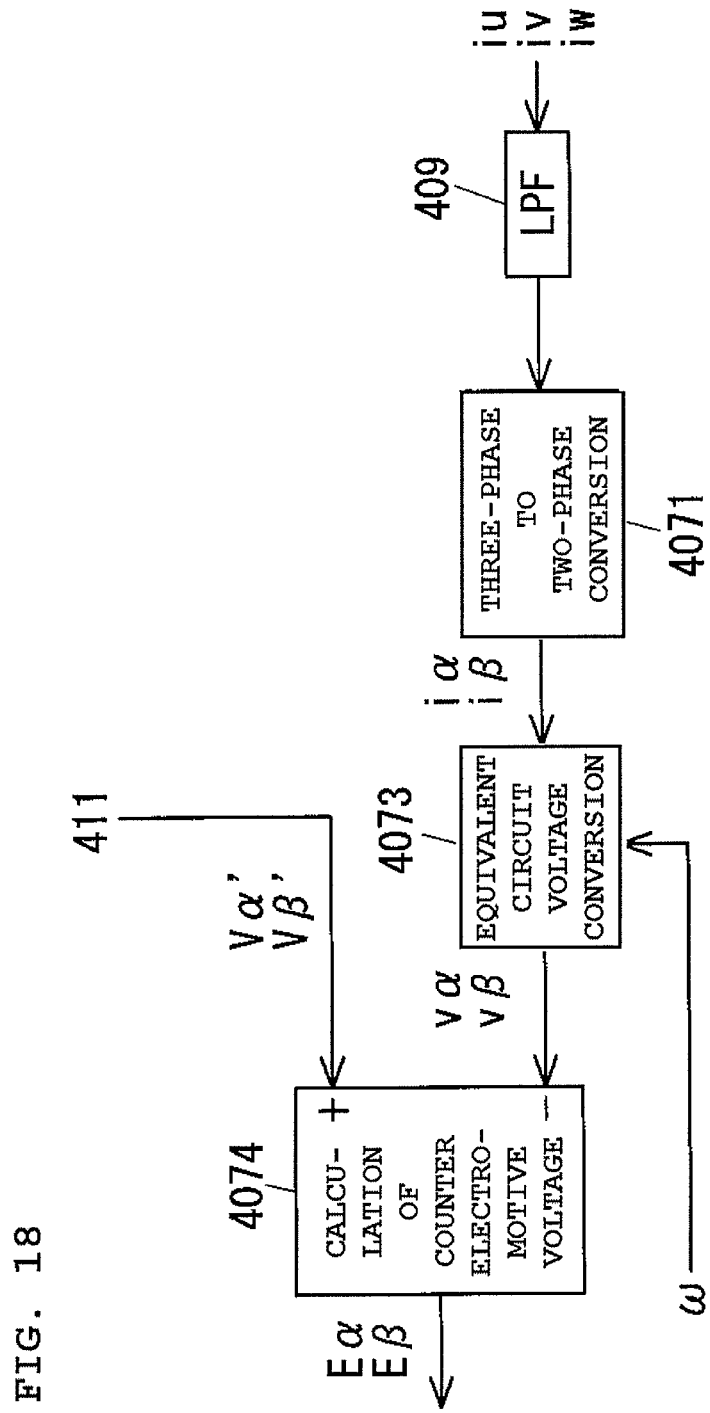
FIG. 18 is a diagram describing an input signal of a counter electromotive voltage arithmetic section.

FIGS. 17 and 18 are diagrams describing other examples of this embodiment. FIG. 17 is a block diagram illustrating the sinusoidal wave driving controller 400, and a phase return correcting section 411 is added to the constitution shown in FIG. 13. FIG. 18 is a diagram describing an input signal of a counter electromotive voltage arithmetic section 4074.

In this modified example, instead of the voltage signals vα' and vβ' based on the motor voltage detection signals, the phases of the voltage commands vα and vβ output from the dq to two-phase voltage converting section 404 are corrected by the phase return correcting section 411, and the voltage signals vα' and vβ' as corrected results are input into the rotational speed and magnetic pole position estimating section 407. As shown in FIG. 18, the counter electromotive voltage arithmetic section 4074 of the rotational speed and magnetic pole position estimating section 407 calculates the counter electromotive voltages Eα and Eβ based on voltage signals Vα' and Vβ' input from the phase return correcting section 411 and voltage signals vα and vβ obtained from the motor current detection signals.

The phase return correcting section 411 delays the voltage commands vα and vβ output from the dq to two-phase voltage converting section 404 by the same phase amount as the leading phase $\phi$ (ω) calculated by the delay correcting section 408. That is to say, the phases (magnetic pole electrical angle) θ' of the voltage commands vα and vβ are replaced by "θ'−$\phi$ (ω)", and the replaced voltage are the voltage signals vα' and vβ'. Since the voltage signals vα' and vβ' calculated in such a manner approximately match with the voltage signals vα' and vβ' obtained from the voltage detection signals, the magnetic pole electrical angle θ and the rotational speed ω that are the approximately same as those in the constitution shown in FIG. 13 are output from the rotational speed and magnetic pole position estimating section 407.

In the sinusoidal wave driving controller 400, the signals output from the low-pass filter 409 are sampled by a sampling frequency fs so as to be subject to a digital process. In the phase return correcting section 411, when data is captured from the dq to two-phase voltage converting section 404, for example, data that is maintained at timing delayed only by a sampling number N given by following Formula (13), namely, the approximately same phase as the leading phase $\phi(\omega)$ is applied.

$$N=\phi(\omega)\times(fs/\omega) \quad (13)$$

When a right side of Formula (13) is not an integer number, the closest integer number is determined as N. The units are ω[rad/s], fs[Hz], and φ[rad].

The leading phase φ(ω) is set based on the filter characteristics of the low-pass filter 409, similarly to the above embodiment. In the above embodiment, the filter characteristics of the low-pass filter 409 with respect to current detection signals are conformed to those of the low-pass filter 410, but in the modified example, the filter characteristics are set so as to be suitable for the current detection signals. For this reason, the phase delay of the magnetic pole electrical angle θ calculated by the rotational speed and magnetic pole position estimating section 407 can be repressed to be smaller than that in the above embodiment.

In the constitution where the rotational speed ω and the magnetic pole electrical angle θ are estimated by using the calculated voltage commands vα and vβ, it is preferable that the phases of the voltage commands vα and vβ are delayed by the same phase as the leading phase φ(ω), and thus the signal delay of the current detection signals is aligned with the signal delay of the voltage signals vα' and vβ'. Also in the modified example, since the PWM control signal is generated based on the corrected magnetic pole electrical angle θ' obtained by correcting the signal delay, similarly to the above embodiment, defects such as the flow ripple of the motor current and the motor step-out are prevented, so that the motor driving stability can be improved.

A two-phase to dq voltage converting section 4075 of the motor driving device according to the present invention converts the counter electromotive voltages (Eα, Eβ) in a fixed coordinate αβ system into the counter electromotive voltages (Ed and Eq) in a rotating coordinate dq system based on the fed-back magnetic pole electrical angle θ, and calculates a magnetic pole phase shift correcting amount Δφ based on the counter electromotive voltages (Ed and Eq). Further, the rotational speed ω and its integrated value ∫ωdt are calculated based on at least information about the motor phase voltage in information about the motor phase voltage and information about the motor phase current, and a sum of the magnetic pole phase shift correcting amount Δφ and the integrated value ∫ωdt is output as the magnetic pole electrical angle θ. A sinusoidal wave driving command is generated based on a difference between the rotational speed ω and a target rotational speed ωi, and the magnetic pole electrical angle θ, and a plurality of switching elements of the inverter are PWM-driven based on the sinusoidal wave driving command.

The magnetic pole phase shift correcting amount Δφ is calculated in the rotating coordinate dq system, and the magnetic pole phase shift correcting amount Δφ is added to the integrated value ∫ωdt so as to be set as the magnetic pole electrical angle θ. For this reason, a steady-state error and a fluctuation error are reduced. Further, since the rotational speed ω is calculated independently from the magnetic pole phase shift correcting amount Δφ, a steady-state error of the rotational speed ω can be reduced. As a result, the drive stability can be improved in sensorless sine wave drive, and flow ripple of a motor current can be reduced and drive efficiency can be improved.

Further, as shown in FIG. 8, it is preferable that the counter electromotive voltages (Eα and Eβ) are converted into counter electromotive voltages (E1d and E1q) in the rotating coordinate dq system based on the integrated value ∫ωdt=θ2 of the rotational speed ω, and the rotational speed ω is calculated based on vector component phases Ψ1 of the counter electromotive voltages (E1d and E1q). When the rotational speed ω is calculated based on periodicity of the signals, occurrence of a steady-state error is further reduced than the conventional case where the calculation is made by using an amplitude value of a counter electromotive voltage.

As shown in FIG. 7, the rotational speed ω may be calculated based on vector component phases θ1 of the counter electromotive voltages (Eα and Eβ) calculated by the counter electromotive voltage arithmetic section 4074. The conversion of the counter electromotive voltages (Eα and Eβ) enables the steady-state error of the rotational speed ω to be reduced.

Further, as shown in FIG. 9, the rotational speed ω may be calculated by utilizing two-phase voltage (vα' and vβ') signals and three-phase voltage (vu, vv and vw) signals before the conversion of the counter electromotive voltages (Eα and Eβ).

As shown in FIG. 13, the phase delay of the magnetic pole electrical angle θ calculated by the rotational speed and magnetic pole position estimating section 407 is corrected so that a corrected magnetic pole electrical angle θ' is generated, and a sinusoidal wave driving command may be generated based on a difference between the estimated rotational speed ω and the target rotational speed ωi and the corrected magnetic pole electrical angle θ'. As a result, an influence of a signal delay caused by the low-pass filters 409 and 410 can be reduced, and the motor driving stability can be further improved.

In the calculation of the magnetic pole phase shift correcting amount Δφ, when the phase angle Ψ shifts greatly from π/2(rad) (for example, Ψ<0), Formula (5) is not used and Δφ may be calculated as a comparatively large value (for example, π/2) in order to improve convergence.

Further, in the generation of the magnetic pole rotational angle θ, it is assumed that the rotational speed ω approximately converges to the actual rotational speed (matches). Therefore, when the estimated rotational speed greatly deviates from the actual rotational speed and an absolute value of ΔΨ1 in Formula (10) is larger than a predetermined threshold, the magnetic pole phase shift correcting amount Δφ may be forcibly set to be zero in order to improve magnetic pole position convergence.

In the above embodiments, the motor current detection and the motor voltage detection in the case of the three phase inputs are described but only two phase inputs are used and one phase input may be calculated based on the two phase inputs. For example, when W phase is calculated, the calculation is made as Iw=−Iu−Iv and Vw=−Vu−Vv.

The above description is only one example, and thus the present invention is not limited to the above embodiments as long as the characteristics of the present invention are not impaired. For example, the present invention can be applied not only to the case of a two-pole motor but also to a multi-pole motor such as a four-pole motor by replacing the electrical angle with one coping with the multi-pole. Further, the above embodiments describe a turbo molecular pump having a turbo pump stage and a drag pump stage as an example, but the present invention can be similarly applied to any vacuum pump in which a rotor is driven to be rotated by a motor. The above embodiments may be used individually or may be combined with each other. This is because the embodiments can produce the effects, respectively, or produce a synergy effect.

What is claimed is:

1. A motor driving device comprising:
   an inverter for driving a motor, the inverter having a plurality of switching elements;
   a first arithmetic section for calculating a rotational speed and a magnetic pole electrical angle of a motor rotor based on information about motor phase voltage and information about motor phase current;

a driving command generating section for generating a sinusoidal wave driving command based on a difference between the rotational speed and a target rotational speed and the magnetic pole electrical angle; and a PWM signal generating section for generating a PWM control signal for controlling an ON/OFF state of the plurality of switching elements based on the sinusoidal wave driving command, wherein the first arithmetic section includes a counter electromotive voltage arithmetic section for calculating a first counter electromotive voltage in a fixed coordinate αβ system based on the information about the motor phase voltage and the information about the motor phase current, a converting section for receiving the magnetic pole electrical angle through feedback and converting the first counter electromotive voltage into a second counter electromotive voltage in a rotating coordinate dq system based on the magnetic pole electrical angle, a second arithmetic section for calculating a magnetic pole phase error based on the second counter electromotive voltage, a third arithmetic section for calculating the rotational speed based on at least the information about the motor phase voltage in the information about the motor phase voltage and the information about the motor phase current, and a fourth arithmetic section for calculating an integrated value of the rotational speed calculated by the third arithmetic section, and the first arithmetic section outputs a sum of the magnetic pole phase error and the integrated value as the magnetic pole electrical angle.

2. The motor driving device according to claim 1, wherein the third arithmetic section includes a converting section for receiving the integrated value as an electrical angle through feedback and converting the first counter electromotive voltage into a third counter electromotive voltage in the rotating coordinate dq system bases on the electrical angle, and the third arithmetic section calculates the rotational speed based on a vector component phase of the third counter electromotive voltage.

3. The motor driving device according to claim 1, wherein the third arithmetic section calculates the rotational speed based on a vector component phase of the first counter electromotive voltage calculated by the counter electromotive voltage arithmetic section.

4. The motor driving device according to claim 1, wherein the information about the motor phase voltage is a signal from a voltage sensor for detecting the motor phase voltage, and the third arithmetic section calculates the rotational speed based on the signal from the voltage sensor.

5. The motor driving device according to claim 1, further comprising:

a delay correcting section for correcting a phase delay of the magnetic pole electrical angle calculated by the first arithmetic section so as to generate a corrected magnetic pole electrical angle, wherein the driving command generating section generates the sinusoidal wave driving command based on the difference between the rotational speed and the target rotational speed and the corrected magnetic pole electrical angle.

6. A vacuum pump comprising:

a pump rotor formed with an evacuating function section;

a motor for driving the pump rotor; and the motor driving device according to claim 1 for driving the motor.

* * * * *